Aug. 6, 1940.  W. F. ALBRIGHT  2,210,559

VALVE

Filed Aug. 30, 1939

INVENTOR,
William F. Albright,
BY Archworth Martin
ATTORNEY.

Patented Aug. 6, 1940

2,210,559

UNITED STATES PATENT OFFICE 2,210,559

VALVE

William F. Albright, Pittsburgh, Pa.

Application August 30, 1939, Serial No. 292,636

3 Claims. (Cl. 251—9)

My invention relates to valves which are suitable for controlling the flow of all fluids such as air and other gases, steam, water, oil and other liquids.

One object of my invention is to provide a valve which avoids the necessity of washers or gaskets at the valve seating surfaces, and which will, nevertheless, when closed, prevent flow at even extremely high pressures.

Another object of my invention is to provide a valve structure wherein the valve seat and the cooperating metallic face of the valve are self-grinding through movements of the valve.

Another object of my invention is to provide a valve structure wherein the cooperating surfaces of the valve and its seat are maintained constantly in engagement by the fluid pressure which enters the valve chamber at all positions of the valve.

Still another object of my invention is to provide a valve structure which can be conveniently of tubular contour on its external surface, and wherein there are no projecting parts.

A further object of my invention is to provide a valve structure wherein a plurality of valve members are positioned in series within the line of flow through a valve chamber and are operable by a single actuating member.

A still further object is to provide a valve suitable for widely varying pressure ranges and of general utility but which, nevertheless, is of simplified and compact form and is self-cleaning.

Figure 1:
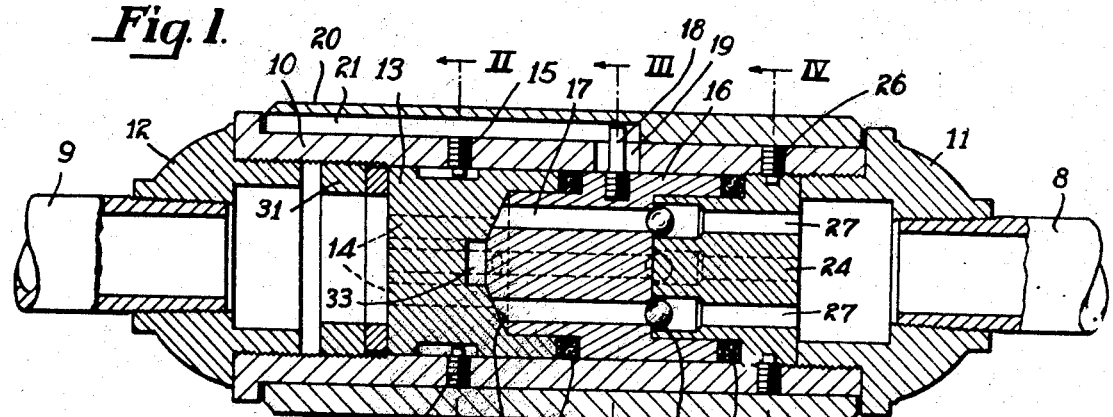
Figure 2:
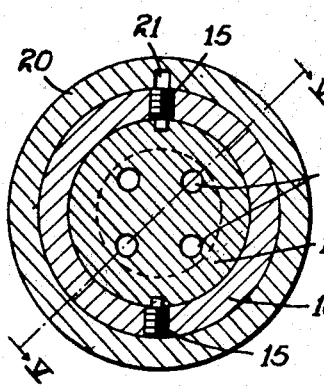
Figure 3:
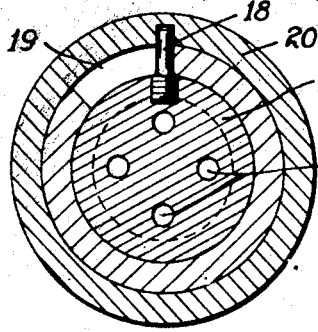
Figure 4:
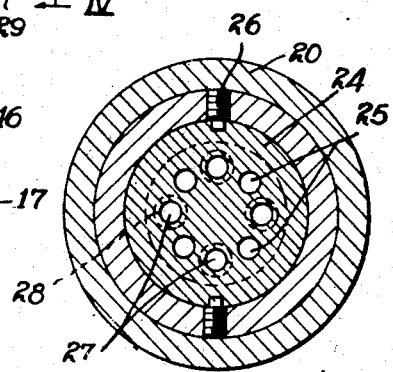
Figure 5:
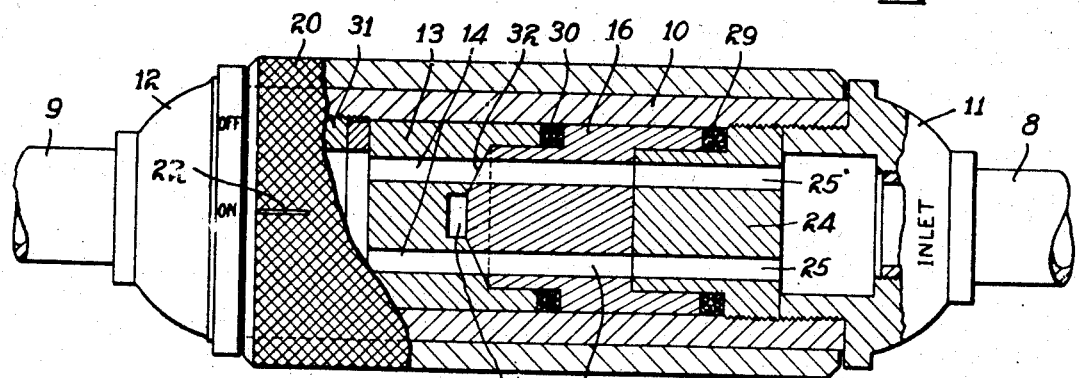
Figures 6, 7:
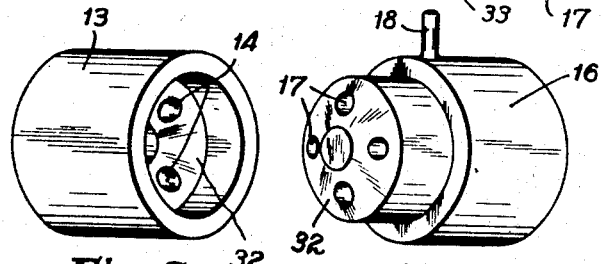

In the accompanying drawing, Figure 1 shows a longitudinal sectional view through the valve, with the valve ports closed; Figs. 2, 3 and 4 are views taken on the lines II—II, III—III and IV—IV, respectively, of Fig. 1; Fig. 5 is a view taken on the line V—V of Fig. 2, and shows the valve ports open to the flow of fluid through the valve; Fig. 6 is a perspective view of the valve seat of Fig. 1, and Fig. 7 is a perspective view of the main valve of Fig. 1.

The valve structure is shown as connected with an inflow pipe 8 and an outflow pipe 9, and comprises a tubular member 10, which serves as a valve chamber, and caps 11 and 12 have screw-threaded connection with the valve chamber 10 and with the pipes 8 and 9.

A valve seat 13 is positioned within the chamber 10 and has passageways or ports 14 extending therethrough. The valve seat is held against rotative movement in the valve chamber by stop screws or studs 15 that extend through the wall of the chamber 10 into longitudinally-extending slots formed in the valve seat 13. A valve 16 is mounted for oscillatory movement in the valve chamber 10 and has passageways 17 extending therethrough which, when the valve is in its open position, will be in alignment with the ports 14. The valve 16 carries a stud 18 which projects through a slot 19 that extends for a short distance circumferentially of the valve chamber 10. The valve 16 is oscillated by means of a sleeve 20 that is provided with a longitudinally-extending slot 21 into which the stud 18 projects, the sleeve being provided with a pointer 22 which registers with "on" and "off" indications on the casing 10, to show whether the valve is open or closed.

A plug 24 is screwed into one end of the valve chamber 10 and has ports or passageways 25 that are always in axial alignment with the ports 14 of the valve seat, and are in axial alignment with the ports 17 of the valve member 16 when the valve is in its open position, as shown more clearly in Fig. 5. The plug 24 is held against idle turning movement by set screws 26 that are carried by the casing 10. The valve plug 24 is also provided with ports 27, the forward ends of which are enlarged to receive balls 28 which serve as valves, in that when the valve member 16 is in such position that its ports 17 are out of registry with the ports 14 in the valve seat 13, said ports 17 will be in registry with the ports 27 and the balls will seat against the ends of the ports 17 to prevent flow of fluid through the valve. This additional sealing effect is particularly useful in connection with air or gases at high pressures, which might tend to leak past the cooperating seating surfaces of the valve 16 and the seat member 13. When the valve 16 is turned to bring its ports 17 into registry with the ports 14, such ports 17 will thereby be brought into registry also with the ports 25 of the valve plug 24, this movement of the valve member 16 serving to push the balls 28 into their bores, by a camming action.

Annular sealing rings 29 and 30 of suitable packing material are provided between the valve 16 and the plug 24 and the valve seat 13, respectively, and these rings are compressed through screwing up of an adjusting ring 31 within the casing 10, the member 31 being adjusted to such position that the packing rings will be compressed to prevent leakage.

It will be seen that the valve can be moved between its fully open and closed positions by about a 45° rotation thereof, and that the valve member 16 will be constantly subjected to pressure from the line 8 at both open and closed positions of the valve, so that the cooperating seating surfaces of the members 16 and 13 will always be maintained in engagement, with minimum danger of foreign material getting between such surfaces. Also, there will be a constant grinding or smoothing of the valve surfaces 32 during rotary movements of the valve, and by reason of the tapered or truncated conical form of the seating surfaces between the members 13 and 16, a better sealing effect will be secured and maintained than if such surfaces were flat. The seating surfaces 32 are desirably tapered on an angle of about 25° to a diametral plane. The seating surfaces 32 are initially ground and fitted to form true complementary surfaces, and the valve seat 13 is provided with a recess 33 at the apex of the inclined surfaces, thus assuring uniform smoothing of the valve surfaces during rotation of the valve 16.

The valve will be not only one of general utility, but will be particularly useful in restricted areas where it is undesirable or impossible to have valve-operating stems projecting from the valve body, and also in the cleaning of boiler tubes, still tubes, milk pipes, etc., wherein it may be convenient to insert the water or steam conductors into the tubes, in which case the valve could be connected in the line near the front end thereof and inserted into the tube to be operated upon. The operator could open the valve immediately preceding insertion thereof into the tube and close the valve before the pipe 9 is completely withdrawn, at the completion of a cleaning operation. The pipe 9 could simply carry flushing water or could supply fluid to a turbine type boiler cleaner. Also, when the valve is employed to control flow of viscous or "dirty" fluid, the valve will be self-cleaning, since the ports are aligned and are parallel to the direction of flow of the fluid.

I claim as my invention:

1. A valve structure comprising a casing, a seating member in the casing and provided with a port radially offset from the center thereof, and extending in an axial direction, a plug member having a port in axial alignment with the first-named port, and having a port offset with respect thereto in a circumferential direction, an auxiliary valve member in the last-named port, a rotatable valve member between the seating member and the plug member and having a port extending therethrough in an axial direction, and means for rotating the valve member to bring its port into registry with the first-named ports, at one position, and into registry with the second-named port of the plug member, at another position, the said auxiliary valve member having seating engagement with the port in the rotatable valve member, at the last-named position thereof.

2. A valve structure comprising a casing having an inlet at one end and an outlet at its other end, a seating member adjacent to the outlet and provided with a port extending axially therethrough, a rotatable valve member having engagement with the inner end of the seating member and provided with a port which is movable into registry with the first-named port, a plug member in the casing adjacent to the inlet end thereof, and provided with a pair of spaced ports, one of which will be in registry with the valve port when the valve port registers with the seat port, and the other one of which will be in registry with the valve port when the valve and seat ports are out of registry, and a valve movable into position to prevent flow from the said other port of the plug member into the valve port, at the last-named position of the valve.

3. A valve structure comprising a casing having inlet and outlet openings adjacent to its ends, a seating member fitting within the casing near the outer end thereof, and provided with a port radially offset from its center, a rotatable valve member fitting within the casing and against the seating member, and provided with an axially-extending port that will be moved into and out of registry with the first-named port, upon rotative movements of the valve, a packing ring positioned to prevent leakage between the peripheral wall of the rotatable valve and the inner wall of the casing, and an auxiliary valve movable into seating engagement with the inner end of the second-named port, when the rotatable valve member is in such position that its port is out of registry with the first-named port.

WILLIAM F. ALBRIGHT.